(12) United States Patent
Yendigeri et al.

(10) Patent No.: US 12,182,858 B2
(45) Date of Patent: Dec. 31, 2024

(54) UTILIZING MACHINE LEARNING AND NATURAL LANGUAGE GENERATION MODELS TO GENERATE A DIGITIZED DYNAMIC CLIENT SOLUTION

(71) Applicant: Accenture Global Solutions Limited, Dublin (IE)

(72) Inventors: Deepa Yendigeri, Maharashtra (IN); Abhijeet Purushottam Patankar, Denton, TX (US); Rajesh Kumar Singh, Patna (IN); Trupti Jay Kapadia, Thane (IN); Anu Gupta, Mumbai (IN); Abhimanyu Sirothia, Mumbai (IN); Manoj Kumar, Bengaluru (IN); Swathi K Gupta, Chennai (IN); Manisha Mallick, Jharkhand (IN); Subhra Mukherjee, West Bengal (IN); Chaya Kolhar, Banaglore (IN)

(73) Assignee: Accenture Global Solutions Limited, Dublin (IE)

( * ) Notice: Subject to any disclaimer, the term of this patent is extended or adjusted under 35 U.S.C. 154(b) by 460 days.

(21) Appl. No.: 17/453,956

(22) Filed: Nov. 8, 2021

(65) Prior Publication Data
US 2023/0141408 A1 May 11, 2023

(51) Int. Cl.
*G06Q 10/0633* (2023.01)
*G06F 40/186* (2020.01)
(Continued)

(52) U.S. Cl.
CPC .......... *G06Q 40/02* (2013.01); *G06F 40/186* (2020.01); *G06N 3/08* (2013.01); *G06Q 10/0633* (2013.01)

(58) Field of Classification Search
None
See application file for complete search history.

(56) References Cited

U.S. PATENT DOCUMENTS

| 8,935,204 B2* | 1/2015 | Peto | G06F 40/117 |
| | | | 707/621 |
| 2011/0061013 A1* | 3/2011 | Bilicki | G06Q 10/06393 |
| | | | 715/771 |

(Continued)

FOREIGN PATENT DOCUMENTS

WO WO-2018161789 A1 * 9/2018 ........... H04N 21/466

OTHER PUBLICATIONS

Alina "How to Create the Right Digital Solution for Your Client", Aug. 2016, The Center for Sales Strategy Blog, pp. 1-4 (Year: 2016).*

(Continued)

*Primary Examiner* — Romain Jeanty
(74) *Attorney, Agent, or Firm* — Polsinelli PC

(57) ABSTRACT

A device may receive historical project data identifying experiences and/or work product from previous projects and client data identifying a client with a problem, and may process the historical project data and the client data, with machine learning models, to generate recommendations for the problem and confidence scores for the recommendations. The device may process the recommendations and the confidence scores, with an NLG model, to generate a solution to the problem and content for the solution, and may generate a digitized dynamic client solution to the problem based on the solution and the content. The device may provide the digitized dynamic client solution to a user device, and may receive feedback on the digitized dynamic client solution from the user device. The device may generate a final digitized dynamic client solution based on the (Continued)

feedback, and may perform actions based on the final digitized dynamic client solution.

18 Claims, 10 Drawing Sheets

(51) Int. Cl.
*G06N 3/08* (2023.01)
*G06Q 40/02* (2023.01)

(56) References Cited

U.S. PATENT DOCUMENTS

| | | | |
|---|---|---|---|
| 2018/0144243 A1* | 5/2018 | Hsieh | G06F 11/30 |
| 2020/0117667 A1* | 4/2020 | Rogynskyy | G06F 40/295 |
| 2020/0186382 A1* | 6/2020 | Harel | G06F 16/24575 |
| 2021/0142217 A1* | 5/2021 | Valline | G06F 16/245 |
| 2021/0304285 A1 | 9/2021 | Alahmady | |

OTHER PUBLICATIONS

Man-Ching Yuen (Task Recommendation in Crowdsourcing Systems), Aug. 2012, CrowdKDD'12, pp. 22-26 (Year: 2012).*
Zhipeng "A Service Brokering and Recommendation Mechanism for Better Selecting Cloud Services", Aug. 2014, PLOS, pp. 1-20 (Year: 2014).*

* cited by examiner

UTILIZING MACHINE LEARNING AND NATURAL LANGUAGE GENERATION MODELS TO GENERATE A DIGITIZED DYNAMIC CLIENT SOLUTION

BACKGROUND

An entity may wish to provide a product and/or a service (e.g., an offering) to a client and may utilize a static client solution (e.g., a presentation, a video, a digital document, and/or the like) to attempt to sell the product and/or the service to the client.

SUMMARY

Some implementations described herein relate to a method. The method may include receiving historical project data identifying experiences and/or work product from previous projects and client data identifying a client with a problem, and processing the historical project data and the client data, with one or more machine learning models, to generate recommendations for the problem of the client and confidence scores for the recommendations. The method may include processing the recommendations and the confidence scores, with a natural language generation model, to generate a solution to the problem of the client and content for the solution, and generating a digitized dynamic client solution to the problem based on the solution and the content for the solution. The method may include providing the digitized dynamic client solution to one or more user devices, and receiving feedback on the digitized dynamic client solution from the one or more user devices. The method may include generating a final digitized dynamic client solution based on the feedback on the digitized dynamic client solution, and performing one or more actions based on the final digitized dynamic client solution.

Some implementations described herein relate to a device. The device may include one or more memories and one or more processors coupled to the one or more memories. The one or more processors may be configured to receive historical project data identifying experiences and/or work product from previous projects and client data identifying a client with a problem, and process the historical project data and the client data, with one or more machine learning models, to generate recommendations for the problem of the client and confidence scores for the recommendations. Each of the recommendations may include a template structure, one or more content sections for the template structure, a design for the template structure, and one or more templates generated by subject matter experts. The one or more processors may be configured to process the recommendations and the confidence scores, with a natural language generation model, to generate a solution to the problem of the client and content for the solution, and generate a digitized dynamic client solution to the problem based on the solution and the content for the solution. The one or more processors may be configured to provide the digitized dynamic client solution to one or more user devices, and receive feedback on the digitized dynamic client solution from the one or more user devices. The one or more processors may be configured to generate a final digitized dynamic client solution based on the feedback on the digitized dynamic client solution, and perform one or more actions based on the final digitized dynamic client solution.

Some implementations described herein relate to a non-transitory computer-readable medium that stores a set of instructions for a device. The set of instructions, when executed by one or more processors of the device, may cause the device to receive historical project data identifying experiences and/or work product from previous projects and client data identifying a client with a problem, and process the historical project data and the client data, with one or more machine learning models, to generate recommendations for the problem of the client and confidence scores for the recommendations. The client data may include data identifying one or more of a financial analysis associated with the client, key financial insights associated with the client, earnings call transcripts associated with the client, priorities associated with the client, operational key performance indicators associated with the client, or value propositions associated with the client. The set of instructions, when executed by one or more processors of the device, may cause the device to process the recommendations and the confidence scores, with a natural language generation model, to generate a solution to the problem of the client and content for the solution, and generate a digitized dynamic client solution to the problem based on the solution and the content for the solution. The set of instructions, when executed by one or more processors of the device, may cause the device to provide the digitized dynamic client solution to one or more user devices, and receive feedback on the digitized dynamic client solution from the one or more user devices. The set of instructions, when executed by one or more processors of the device, may cause the device to generate a final digitized dynamic client solution based on the feedback on the digitized dynamic client solution, and perform one or more actions based on the final digitized dynamic client solution.

DETAILED DESCRIPTION

Figure 1A:
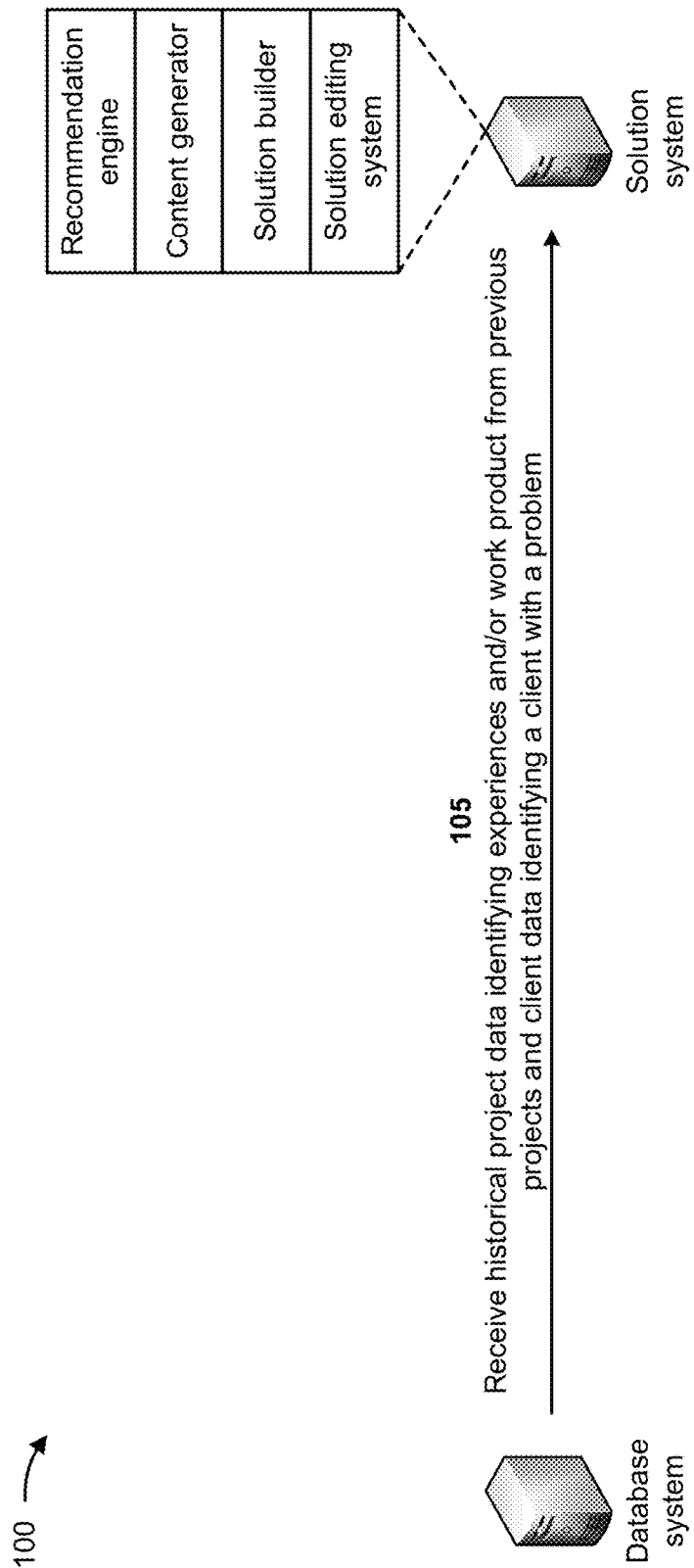
FIGS. 1A-1F are diagrams of an example implementation described herein.

The following detailed description of example implementations refers to the accompanying drawings. The same reference numbers in different drawings may identify the same or similar elements.

Current techniques for creating a static client solution require extensive manual gathering of insights from various internal and external sources and combining the insights with industry knowledge, historical content data, and existing thought leadership content to generate a story for the static client solution. A static client solution may include content that does not support receiving or processing interactive input from a user. Examples of static client solutions may include PowerPoint slides, reports, images, and/or the like. The story is utilized in an iterative manual design and development process to generate the static client solution. Such techniques include major dependencies on various teams, with a long turn-around-time of multiple (e.g., ten to fifteen) days, which may lead to lost business opportunities with a client. Therefore, current techniques for creating a static client solution consume computing resources (e.g., processing resources, memory resources, communication resources, and/or the like), networking resources, and/or the like associated with failing to create a timely static client solution, coordinating various teams of personnel to generate an untimely static client solution, losing business opportunities with the client due to the untimely static client solution, and/or the like.

Some implementations described herein relate to a solution system that utilizes machine learning and natural language generation models to generate a digitized dynamic client solution. For example, the solution system may receive historical project data identifying experiences and/or work product from previous projects and client data identifying a client with a problem, and may process the historical project data and the client data, with one or more machine learning models, to generate recommendations for the problem of the client and confidence scores for the recommendations. The solution system may process the recommendations and the confidence scores, with a natural language generation model, to generate a solution to the problem of the client and content for the solution, and may generate a digitized dynamic client solution to the problem based on the solution and the content for the solution. The solution system may provide the digitized dynamic client solution to one or more user devices, and may receive feedback on the digitized dynamic client solution from the one or more user devices. The solution system may generate a final digitized dynamic client solution based on the feedback on the digitized dynamic client solution, and may perform one or more actions based on the final digitized dynamic client solution.

In this way, the solution system utilizes machine learning and natural language generation models to generate a digitized dynamic client solution. The solution system may utilize artificial intelligence and machine learning to eliminate manual dependencies in the creation of a client solution by automatically leveraging thought leadership content and by analyzing various client-related factors. The solution system may process the client solution, with natural language generation (NLG) models, to produce layouts, paragraphs, and appropriate imagery for the client solution. The solution system may automatically combine the client solution, the layouts, the paragraphs, and the appropriate imagery together to generate a digitized dynamic client solution that provides a tailor-made experience for a potential client. The solution system drastically reduces the turn-around time for producing the digitized dynamic client solution from days (e.g., ten to fifteen days) to hours (e.g., six to eight hours). In contrast to the inefficient manual techniques that create static presentations, the solution system may create dynamic (e.g., interactive) content customized for a particular client using microsites (e.g., portals, web pages, and/or the like). The digitized dynamic client solutions may support interactive operations with a user, such as receiving real-time user input to edit, update, confirm/reject, and/or the like, content in the digitized dynamic client solution. The solution system may utilize models optimized for particular data types (e.g., text data versus image data, structured data versus unstructured data, and/or the like) and that can execute independently (e.g., a recommendation model for image data is independent from a recommendation model for text data). Also, the invention can employ multiple models that are trained in parallel and then aggregated. This, in turn, conserves computing resources, networking resources, and/or the like that would otherwise have been consumed in failing to create a timely digitized dynamic client solution, coordinating various teams of personnel to generate an untimely client solution, losing business opportunities with the client due to the untimely client solution, and/or the like.

FIGS. 1A-1F are diagrams of an example 100 associated with utilizing machine learning and natural language generation models to generate a digitized dynamic client solution. As shown in FIGS. 1A-1F, example 100 includes a database system, a user device, and a solution system. The database system may include an application server, a client server, a web server, a database server, a host server, a proxy server, a virtual server, or a server in a cloud computing system. The user device may include a wireless communication device, a mobile phone, a user equipment, a laptop computer, a tablet computer, a desktop computer, and/or the like. The solution system may include a system that utilizes machine learning and natural language generation models to generate a digitized dynamic client solution. Further details of the database system, the user device, and the solution system are provided elsewhere herein.

As shown in FIG. 1A, and by reference number 105, the solution system may receive, from the database system, historical project data identifying experiences from previous projects and client data identifying a client with a problem. For example, the solution system may automatically receive the historical project data and/or the client data from the database system, may periodically receive the historical project data and/or the client data from the database system, may receive the historical project data and/or the client data from the database system based on a request provided to the database system, and/or the like. The historical project data may identify the experiences and/or the work product from previous projects associated with other clients and/or with a target client. The historical project data may include experiences and/or work product from previous projects based on technologies of clients, geographies of clients, industries of clients, whether deals were won for client solutions, web metrics of client solutions shared with clients for identifying the most popular client solutions, and/or the like.

The client data may include structured and unstructured data, such as a financial analysis of the client, key financial insights of the client, earnings call transcripts and/or news associated with the client, priorities associated with the client, operational key performance indicators (KPIs) of the client value propositions of the client, and/or the like. In some implementations, the solution system may receive the client data from data sources, such as the database system, websites, images, documents, and/or the like. The solution system may extract the client data from the data sources based on an accelerator (e.g., a client name, a client geography, a client market, a client technology, and/or the like), asset consumption of the client, whether past deals have been won for the client, value propositions of the client, and/or the like.

As further shown in FIG. 1A, the solution system may include a recommendation engine, a content generator, a solution builder, and a solution editing system. The recommendation engine may utilize one or more machine learning models to process thought leadership content from subject matter experts and to analyze various factors (e.g., a financial analysis of the client, key financial insights of the client, earnings call transcripts and/or news associated with the client, priorities associated with the client, operational KPIs of the client value propositions of the client, and/or the like), to accelerate customization of a client solution via recommendations. The content generator may process the recommendations, with a NLG model, to generate layouts, paragraphs, and imagery for a client story, in the form of a tailor-made solution for a potential client. The solution builder may utilize the content generated by the recommendation engine and the content generator to automatically create a digitized dynamic client solution that may be utilized by sales personnel during a sales pitch to the client and may be further customized via the solution editing system. The solution editing system may enable users of the solution system to edit and customize the digitized dynamic client solution, such as by adding or editing folds within a template, adding images and/or videos, adding a client logo, hiding and/or reordering folds, and/or the like. Further details of the recommendation engine, the content generator, the solution builder, and the solution editing system are provided elsewhere herein.

Figure 1B:
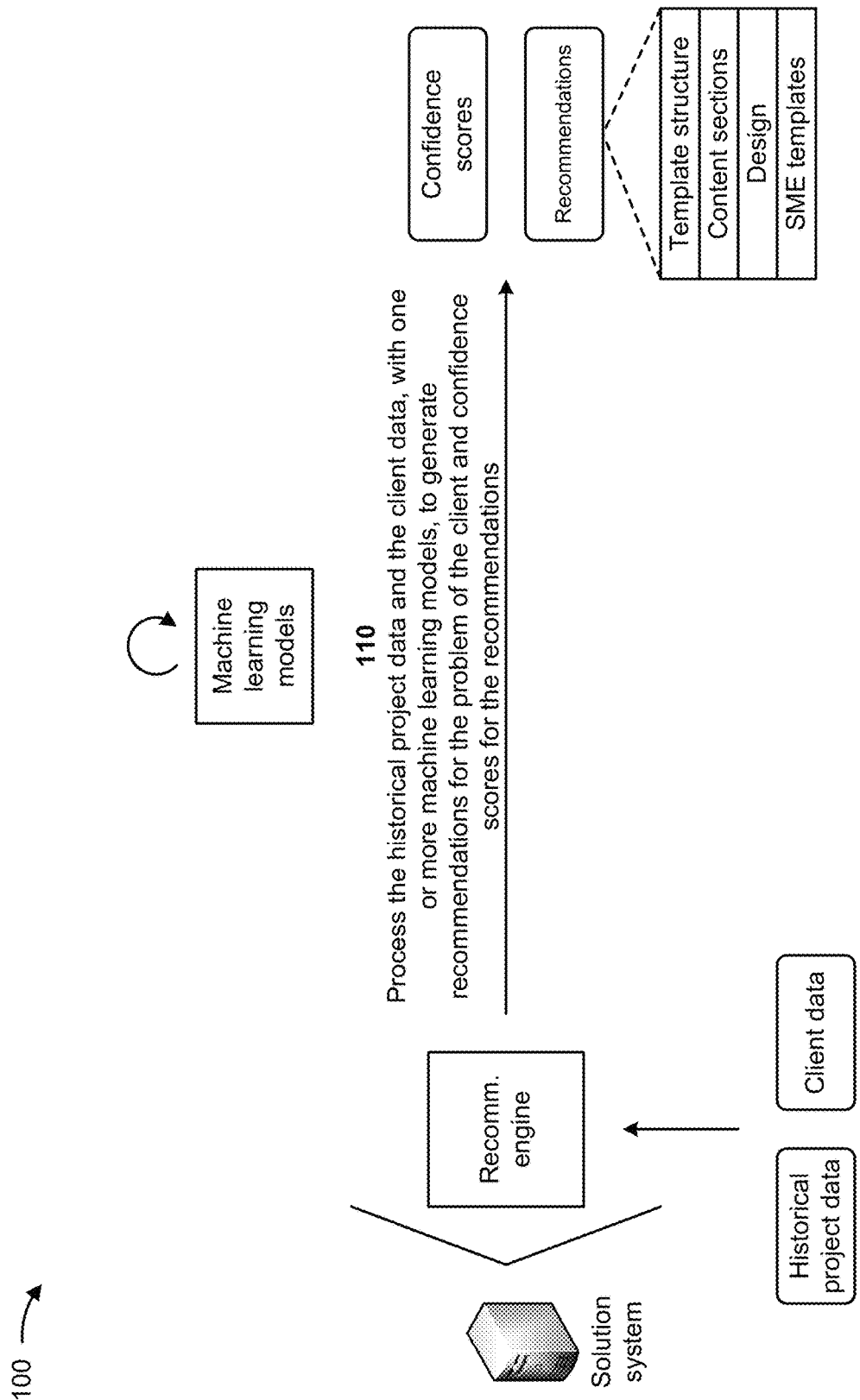

As shown in FIG. 1B, and by reference number 110, the recommendation engine of the solution system may process the historical project data and the client data, with one or more machine learning models, to generate recommendations for the problem of the client and confidence scores for the recommendations. For example, the recommendation engine may utilize a hybrid technique to generate the recommendations for the problem and the confidence scores for the recommendations. The hybrid technique may utilize both content-based machine learning models and collaboration-based machine learning models to generate content-based recommendations and collaboration-based recommendations, respectively. A content-based recommendation may include a rule-based filtering recommendation that is generated based on properties of the historical project data and the client data. For example, the recommendation engine may utilize parameters (e.g., a client name, a client technology, a client geography, a client industry, and/or the like) to generate the content-based recommendations. A collaboration-based recommendation may be based on a user behavior (e.g., a behavior specific to a creator of a solution, such as previous solutions generated by the creator). For example, the recommendation engine may utilize parameters (e.g., a type of industry and/or client for which a solution is being generated, subject matter template data, the client data, and/or the like) to generate the collaboration-based recommendations. In some implementations, the recommendation engine may generate only content-based recommendations, only collaboration-based recommendations, or both content-based recommendations and collaboration-based recommendations.

In some implementations, the recommendation engine may process the historical project data and the client data, with a cosine similarity model and a density-based clustering model (e.g., a density-based spatial clustering of applications with noise (DBSCAN) model), to generate one or more content-based recommendations for the problem. The recommendation engine may pre-process the historical project data and the client data to remove unwanted, noisy data from the data and to convert the data into vectors using term frequency-inverse document frequency (TF-IDF) vectorization. The recommendation engine may compare the vectors with other vectors (e.g., from existing text) to generate a value (e.g., the cosine similarity). The value may vary from negative one (−1) to one (1), with one indicating exactly similar vectors, and negative one indicating opposite vectors. In this way, the recommendation engine may create a cosine similarity matrix that is utilized to perform clustering. The solution system may utilize the DBSCAN model for identifying clusters (e.g., the one or more content-based recommendations for the problem) for the recommendation engine.

In some implementations, the recommendation engine may apply weights to the recommendations based on historical success rates associated with the recommendations, and may generate the confidence scores for the recommendations based on applying the weights to the recommendations. The recommendation engine may utilize matrix factorization to calculate weights applied to the recommendations. In some implementations, the recommendation engine may generate the one or more collaborative-based recommendations for the problem based on profiles of one or more creators of the solution. The recommendation engine may utilize a single value decomposition (SVD) model to combine the one or more content-based recommendations and the one or more collaborative-based recommendations and to generate the recommendations for the problem. In some implementations, the recommendation engine may utilize a convolutional neural network (CNN) model to process and analyze images (e.g., grayscale images and color images) of the recommendations for the problem.

As further shown in FIG. 1B, each of the one or more recommendations may include a template structure, one or more content sections for the template structure, a design for the template structure, one or more templates generated by subject matter experts, and/or the like. The template structure may include a logo, color coding, content structure, and/or the like of the template. The content sections may include details about a project, such as key initiatives, features, and/or the like. The design for the template may be based on a technology, a geography, an industry, and/or the like associated with the client. The templates generated by subject matter experts may be referred to as golden templates. The recommendation engine may tier and weight each of the one or more recommendations (e.g., based on the confidence scores), with a highest priority being assigned to historically successful recommendations.

Figure 1C:
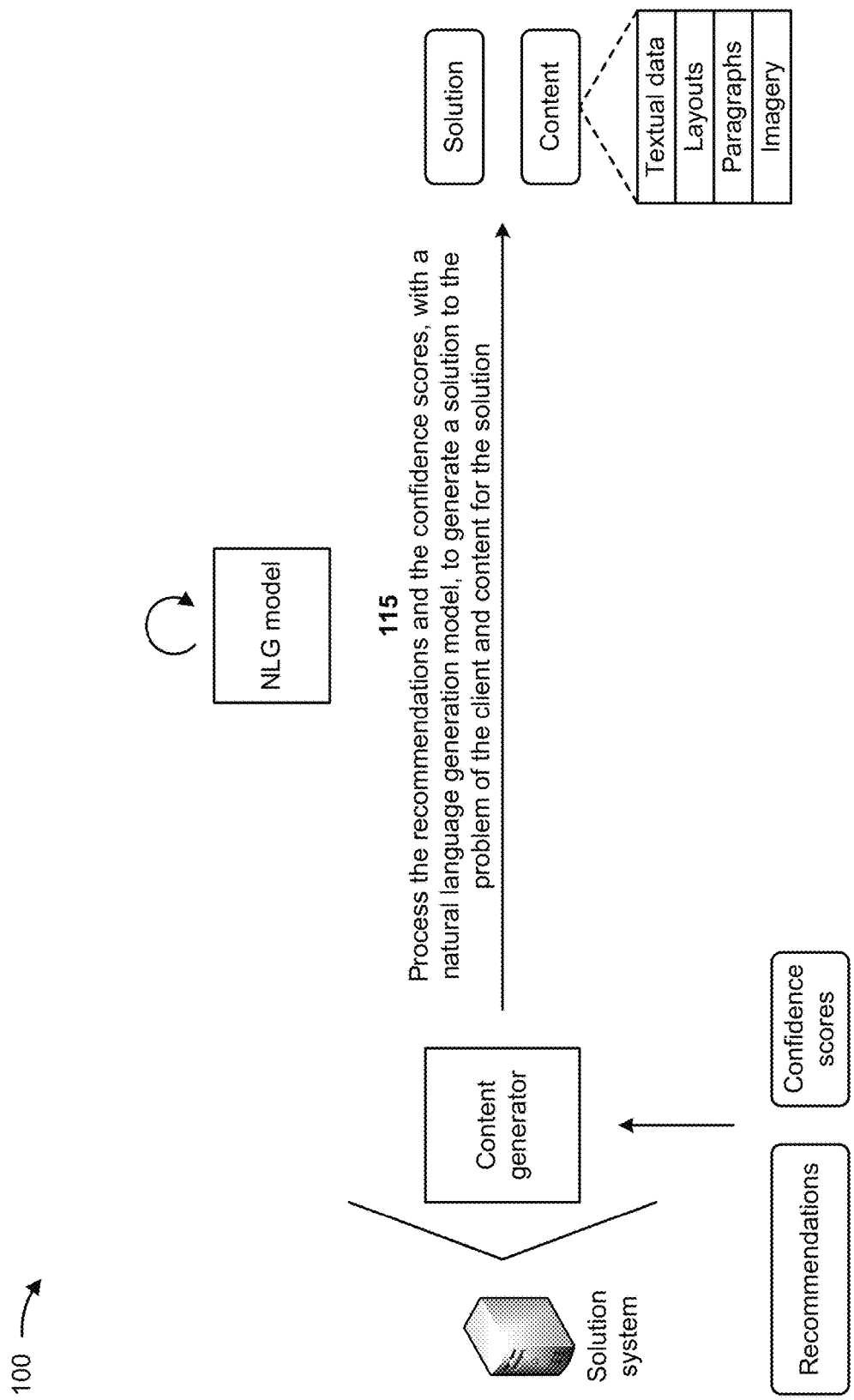

As shown in FIG. 1C, and by reference number 115, the content generator of the solution system may process the recommendations and the confidence scores, with a NLG model, to generate a solution to the problem of the client and content for the solution. In some implementations, when processing the recommendations and the confidence scores, with the NLG model, to generate the solution and the content for the solution, the content generator may receive template data identifying templates generated by subject matter experts and client solutions data identifying solutions generated for clients similar to the client (e.g., clients in the same industry as the client, in the same geographic area as the client, associated with the same technology as the client, and/or the like). The template data, the client solutions data, and the client data may provide a dataset for the content generator to produce meaningful phrases and sentences in the form of natural language.

The content generator may process the recommendations, the confidence scores, the template data, the client solutions data, and the client data, with a recurrent neural network (RNN) model (e.g., a long short-term memory (LSTM) model), to generate the solution to the problem and the content for the solution. The RNN model may pass each data point of the data through a feedforward network and may utilize an output of the feedforward network as input to next data point of the data, allowing the data point in a previous step to be stored. In each iteration, the RNN model may store previously encountered words and may calculate a probability of a next word. For each word in a dictionary, the RNN model may assign a probability based on a previous word, and may select a word with a highest probability and may store the previous word. The LSTM model is a variant of the RNN model and may produce coherent long sentences as the content for the solution.

As further shown in FIG. 1C, the solution includes one of the recommendations and the content for the solution includes textual data for the solution, layouts for the solution, paragraphs for the solution, and imagery for the solution. The textual data may include the sentences generated by the LSTM model. The layouts for the solution may include an arrangement of the textual data. The paragraphs for the solution may include a grouping of the sentences to form paragraphs. The imagery for the solution may include videos, images, audio data, and/or the like associated with the textual data. In some implementations, the recommendation engine and the content generator may train and/or execute the multiple models, described above, in parallel.

Figure 1D:
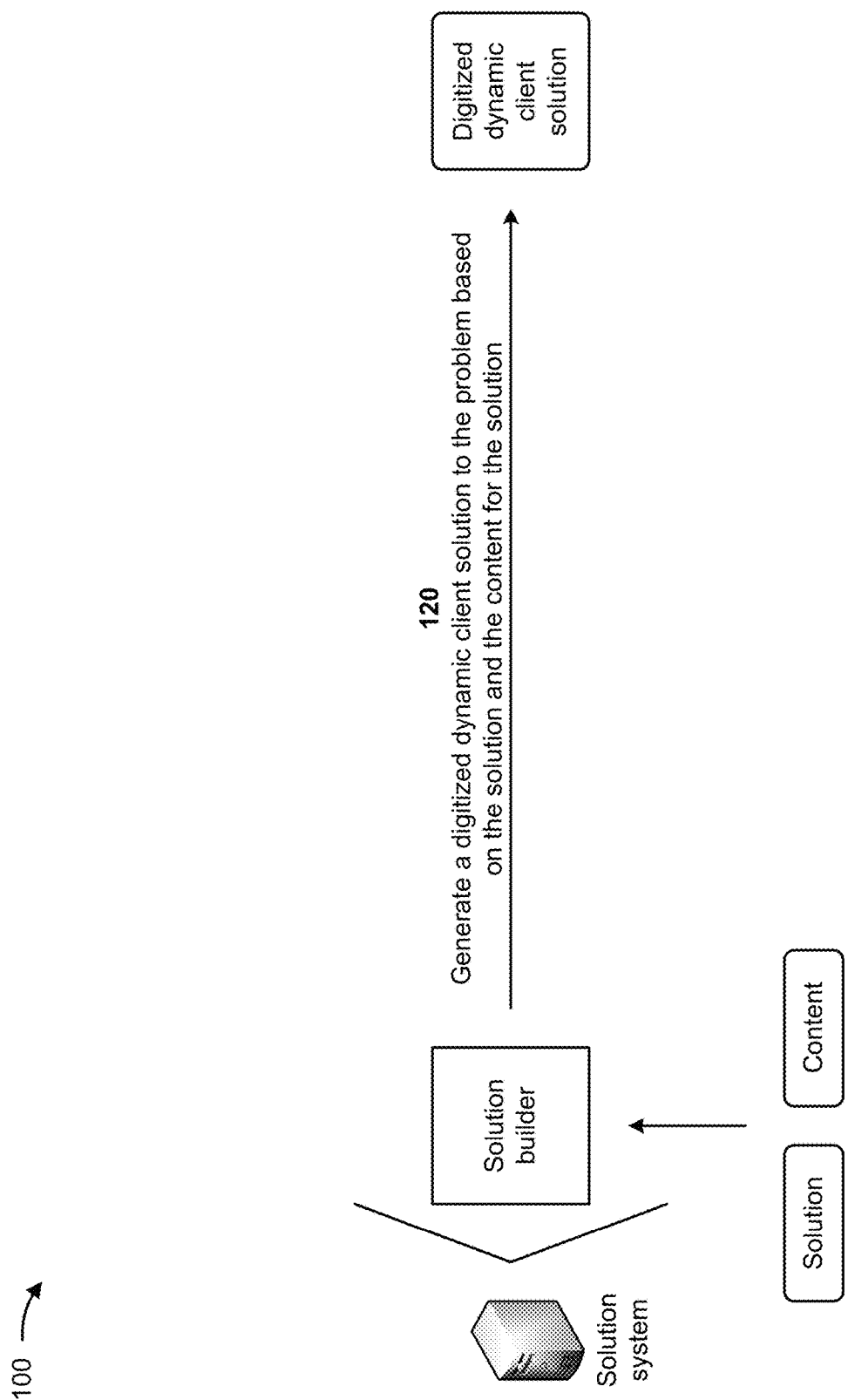

As shown in FIG. 1D, and by reference number 120, the solution builder of the solution system may generate a digitized dynamic client solution to the problem based on the solution and the content for the solution. For example, the solution builder may utilize the solution and the content generated by the recommendation engine and the content generator to automatically create a digitized dynamic client solution that may be utilized by sales personnel during a sales pitch to the client and may be further customized via the solution editing system. The digitized dynamic client solution may include an interactive solution that may be manipulated and modified by the sales personnel and/or the client. For example, the digitized dynamic client solution may include an interactive digital presentation, an interactive video, an interactive web page, an interactive digital document, and/or the like.

Figure 1E:
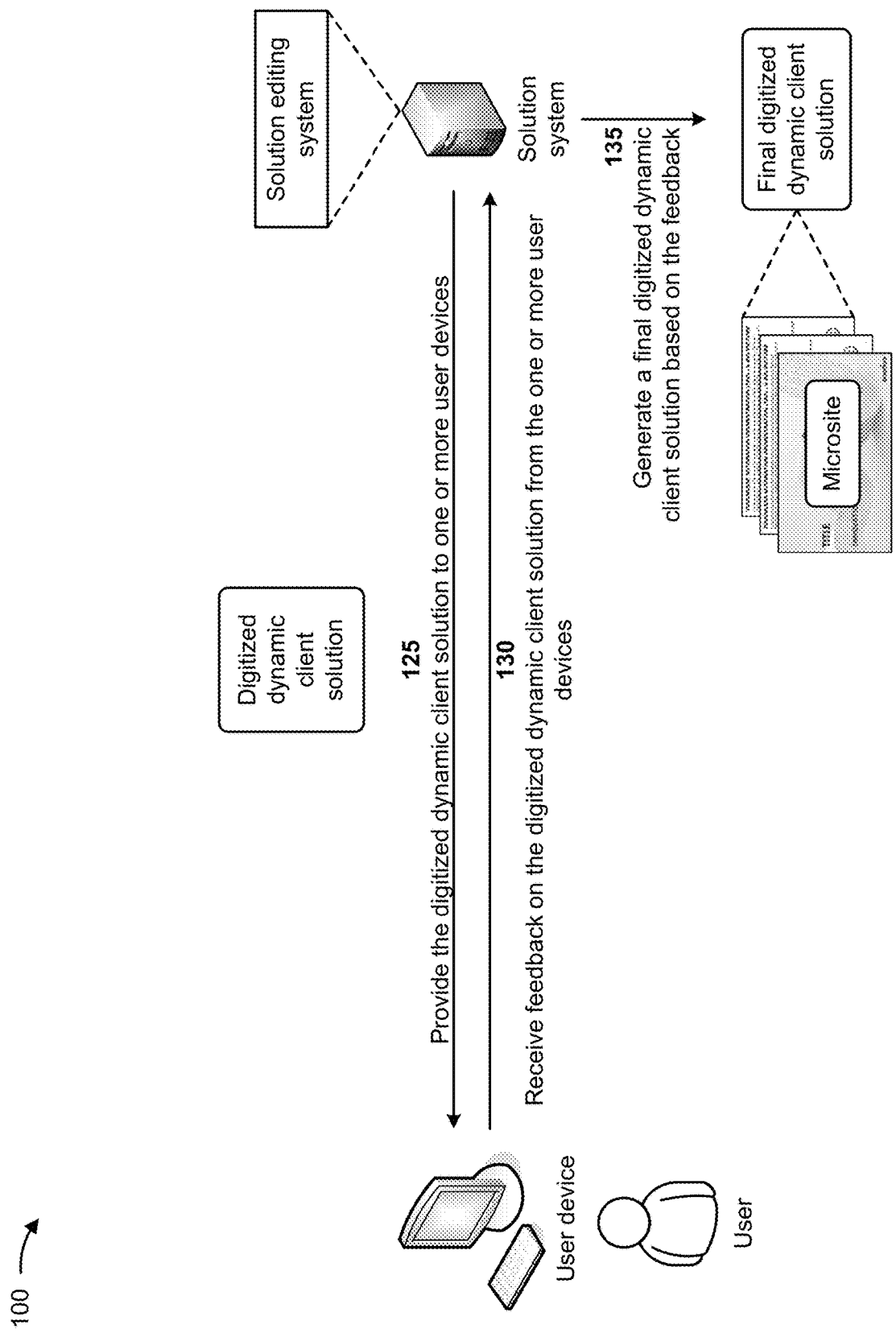

As shown in FIG. 1E, and by reference number 125, the solution editing system of the solution system may provide the digitized dynamic client solution to one or more user devices. For example, the solution editing system may enable users (e.g., of the user devices) to edit and customize the digitized dynamic client solution, such as by adding or editing folds (e.g., pages or sections) within a template, adding images and/or videos, adding a client logo, hiding and/or reordering folds, and/or the like. The solution editing system may provide the digitized client solution to the one or more user devices and the one or more user devices may display the digitized client solution to the users of the one or more user devices.

In some implementations, the solution editing system may enable multiple levels of users to access the digitized client solution and may assign different permissions and capabilities to each level, such as a solution owner, a solution editor, a solution viewer, and/or the like. For example, a solution viewer may only have permission to view the digitized client solution, the solution editors may have additional permissions that allow them to modify and customize the digitized client solution, and/or the like. The users may be registered with the solution system so that they may access the digitized client solution or may simultaneously view and/or modify the digitized client solution. In one example, if a user edits a portion of the digitized client solution, the portion may be locked for other users. Another user would not be able to edit that same portion of the digitized client solution but may edit any other portion of the digitized client solution that is not locked.

As further shown in FIG. 1E, and by reference number 130, the solution editing system of the solution system may receive feedback on the digitized dynamic client solution from the one or more user devices. For example, the one or more user devices may provide edits to the digitized client solution (e.g., performed by the users), as the feedback, to the solution editing system. The feedback may include one or more added or edited folds for a template of the digitized dynamic client solution, one or more added images for the digitized dynamic client solution, one or more added videos for the digitized dynamic client solution, an added logo of the client for the digitized dynamic client solution, one or more hidden or reordered folds for the template of the digitized dynamic client solution, and/or the like.

As further shown in FIG. 1E, and by reference number 135, the solution editing system of the solution system may generate a final digitized dynamic client solution based on the feedback. For example, the solution editing system may utilize the feedback to modify the digitized dynamic client solution and to generate the final digitized dynamic client solution. The final digitized dynamic client solution may include an interactive digital presentation, an interactive video, an interactive web page (e.g., an interactive microsite), an interactive digital document, and/or the like. An interactive microsite may include a published interactive web page where client-specific data may be rendered (e.g., the final digitized dynamic client solution). The web page may be restricted to sales personnel assigned to the client, developers of the final digitized dynamic client solution, and client personnel.

Figure 1F:
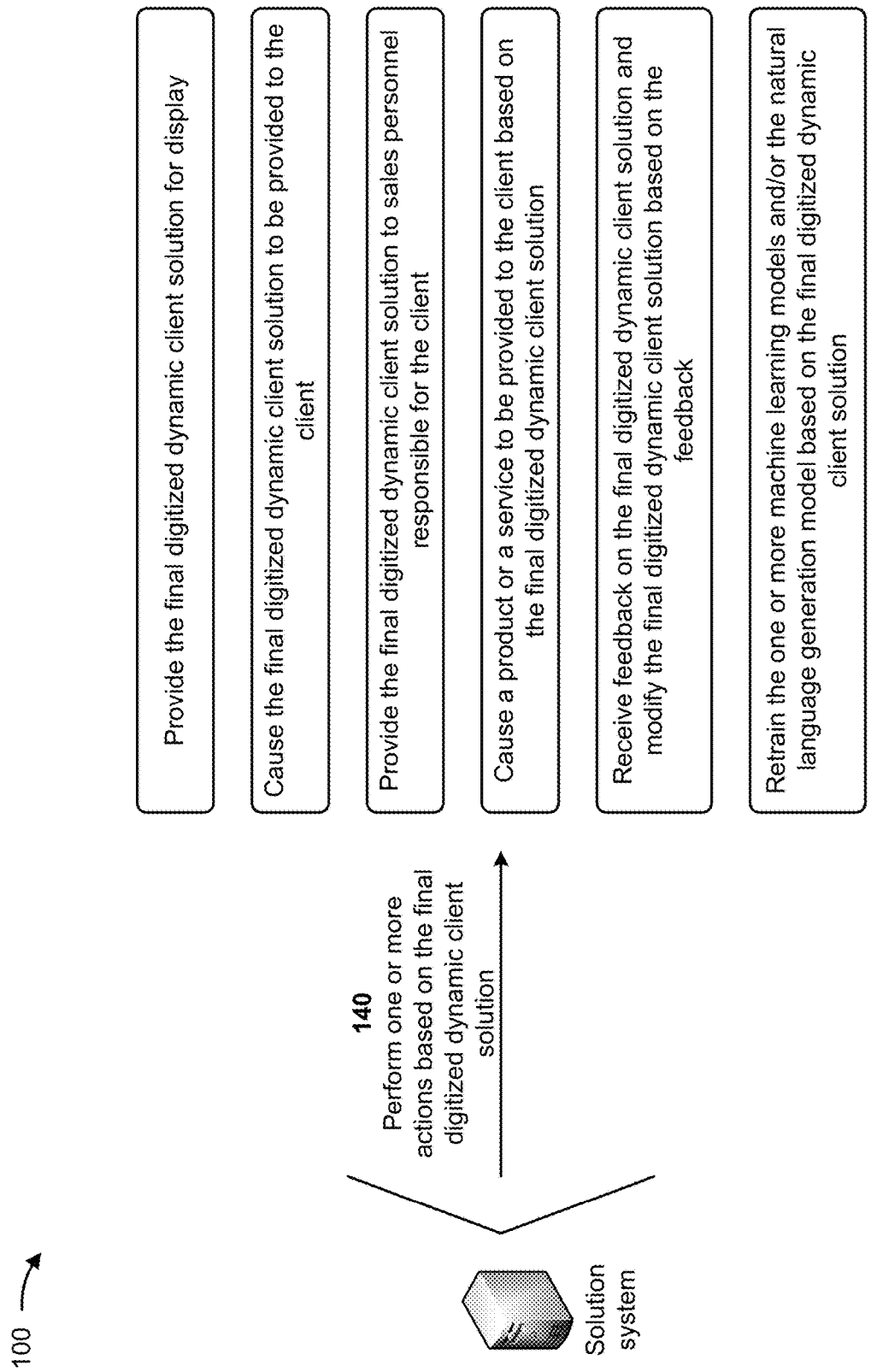

As shown in FIG. 1F, and by reference number 140, the solution system may perform one or more actions based on the final digitized dynamic client solution. In some implementations, performing the one or more actions includes the solution system providing the final digitized dynamic client solution for display. For example, the solution system may provide the final digitized dynamic client solution to a user device and the user device may display the final digitized dynamic client solution to a user. This may enable the user to modify and/or interact with the final digitized dynamic client solution. In this way, the solution system conserves computing resources, networking resources, and/or the like that would otherwise have been consumed in failing to create a timely client solution.

In some implementations, performing the one or more actions includes the solution system causing the final digitized dynamic client solution to be provided to the client. For example, the solution system may provide the client with access to the final digitized dynamic client solution via a client portal, a web page, and/or the like. The client may view the final digitized dynamic client solution and/or may interact with the final digitized dynamic client solution. In this way, the solution system conserves computing resources, networking resources, and/or the like that would otherwise have been consumed in failing to create a timely client solution, coordinating various teams of personnel to generate an untimely client solution, losing business opportunities with the client due to the untimely client solution, and/or the like.

In some implementations, performing the one or more actions includes the solution system providing the final digitized dynamic client solution to sales personnel responsible for the client. For example, the solution system may provide the final digitized dynamic client solution to a user device and the user device may display the final digitized dynamic client solution to the sales personnel. This may enable the sales personnel to present the final digitized dynamic client solution to the client. In this way, the solution system conserves computing resources, networking resources, and/or the like that would otherwise have been consumed in failing to create a timely client solution, losing business opportunities with the client due to the untimely client solution, and/or the like.

In some implementations, performing the one or more actions includes the solution system causing a product or a service to be provided to the client based on the final digitized dynamic client solution. For example, the client may decide to purchase a product or a service based on viewing the final digitized dynamic client solution. The solution system may cause the product or the service to be ordered and provided to the client based on the client's purchase. In this way, the solution system conserves computing resources, networking resources, and/or the like that would otherwise have been consumed in losing business opportunities with the client due to the untimely client solution, and/or the like.

In some implementations, performing the one or more actions includes the solution system receiving feedback on the final digitized dynamic client solution and modifying the final digitized dynamic client solution based on the feedback. For example, the solution system may receive feedback on the final digitized dynamic client solution from the client and/or from sales personnel for the client. The solution system may modify the final digitized dynamic client solution based on the feedback and may provide the modified final digitized dynamic client solution to the client and/or the sales personnel. In this way, the solution system conserves computing resources, networking resources, and/or the like that would otherwise have been consumed in failing to create a timely client solution, coordinating various teams of personnel to generate an untimely client solution, and/or the like.

In some implementations, performing the one or more actions includes the solution system retraining the one or more machine learning models and/or the natural language generation model based on the final digitized dynamic client solution. For example, the solution system may utilize the final digitized dynamic client solution as additional training data for retraining the one or more machine learning models and/or the natural language generation model, thereby increasing the quantity of training data available for training the one or more machine learning models and/or the natural language generation model. Accordingly, the solution system may conserve computing resources associated with identifying, obtaining, and/or generating historical data for training the one or more machine learning models and/or the natural language generation model relative to other systems for identifying, obtaining, and/or generating historical data for training machine learning models.

In this way, the solution system utilizes machine learning and natural language generation models to generate a digitized dynamic client solution. The solution system may utilize artificial intelligence and machine learning to eliminate manual dependencies in the creation of a client solution by automatically leveraging thought leadership content and by analyzing various client-related factors. The solution system may process the client solution, with natural language generation models, to produce layouts, paragraphs, and appropriate imagery for the client solution. The solution system may automatically combine the client solution, the layouts, the paragraphs, and the appropriate imagery together to generate a digitized dynamic client solution that provides a tailor-made experience for a potential client. The solution system drastically reduces the turn-around time for producing the digitized dynamic client solution from days (e.g., ten to fifteen days) to hours (e.g., six to eight hours). This, in turn, conserves computing resources, networking resources, and/or the like that would otherwise have been consumed in failing to create a timely client solution, coordinating various teams of personnel to generate an untimely client solution, losing business opportunities with the client due to the untimely client solution, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
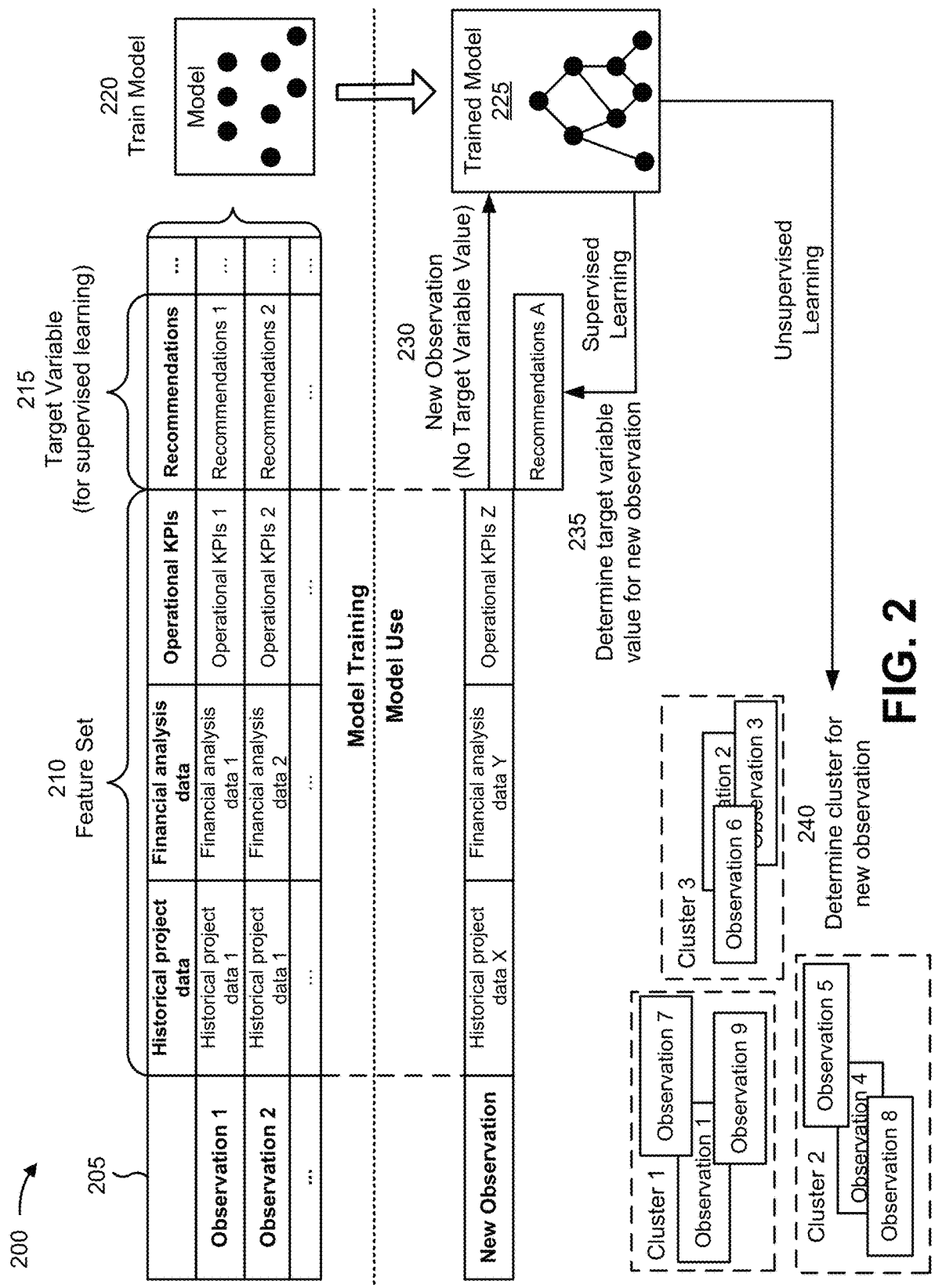
FIG. 2 is a diagram illustrating an example of training and using a machine learning model in connection with generating a digitized dynamic client solution.

FIG. 2 is a diagram illustrating an example 200 of training and using a machine learning model (e.g., the cosine similarity model) in connection with generating a digitized dynamic client solution. Similarly, techniques may be utilized for training and using the CNN model, the SVD model, the DBSCAN model, the LSTM model, the RNN model, and/or the natural language generation model. The machine learning model training and usage described herein may be performed using a machine learning system. The machine learning system may include or may be included in a computing device, a server, a cloud computing environment, and/or the like, such as the solution system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the solution system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the solution system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of historical project data, a second feature of financial analysis data, a third feature of operational key performance indicators (KPIs), and so on. As shown, for a first observation, the first feature may have a value of historical project data 1, the second feature may have a value of financial analysis data 1, the third feature may have a value of operational KPIs 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable are recommendations, which has a value of recommendations 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of historical project data X, a second feature of financial analysis data Y, a third feature of operational KPIs Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of recommendations A for the target variable of the recommendations for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a historical project data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a financial analysis data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to generate a digitized dynamic client solution. The machine learning system enables recognition and/or identification of tens, hundreds, thousands, or millions of features and/or feature values for tens, hundreds, thousands, or millions of observations, thereby increasing accuracy and consistency and reducing delay associated with generating a digitized dynamic client solution relative to requiring computing resources to be allocated for tens, hundreds, or thousands of operators to manually generate a digitized dynamic client solution.

As indicated above, FIG. 2 is provided as an example. Other examples may differ from what is described in connection with FIG. 2.

Figure 3:
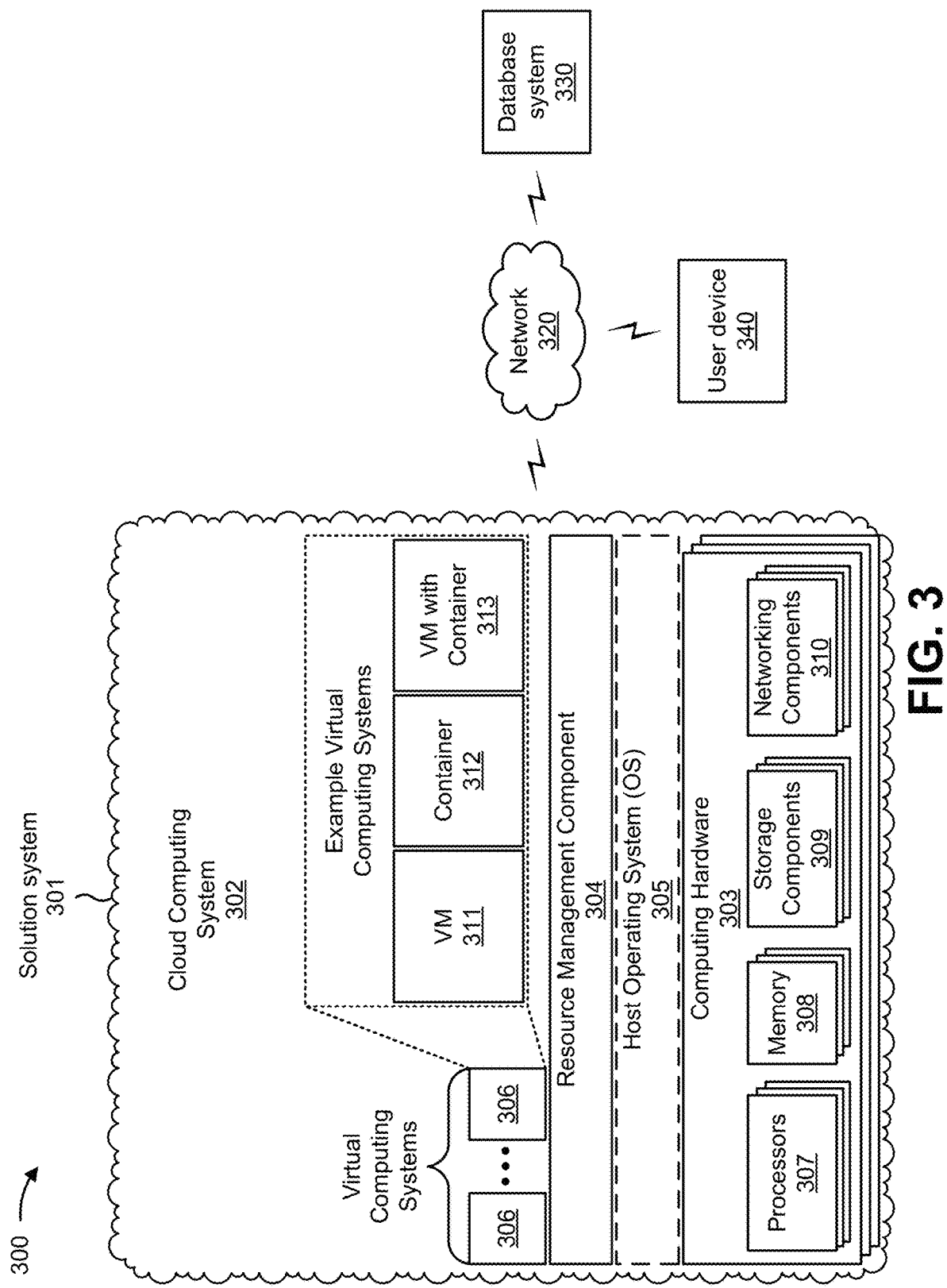
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a solution system 301, which may include one or more elements of and/or may execute within a cloud computing system 302. The cloud computing system 302 may include one or more elements 303-313, as described in more detail below. As further shown in FIG. 3, the environment 300 may include a network 320, a database system 330, and/or a user device 340. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the solution system 301 may include one or more elements 303-313 of the cloud computing system 302, may execute within the cloud computing system 302, and/or may be hosted within the cloud computing system 302, in some implementations, the solution system 301 may not be cloud-based (e.g., may be implemented outside of a cloud computing system) or may be partially cloud-based. For example, the solution system 301 may include one or more devices that are not part of the cloud computing system 302, such as device 400 of FIG. 4, which may include a stand-alone server or another type of computing device. The solution system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The database system 330 includes one or more devices capable of receiving, generating, storing, processing, providing, and/or routing information, as described elsewhere herein. The database system 330 may include a communication device and/or a computing device. For example, the database system 330 may include a server, such as an application server, a client server, a web server, a database server, a host server, a proxy server, a virtual server (e.g., executing on computing hardware), or a server in a cloud computing system. In some implementations, the database system 330 includes computing hardware used in a cloud computing environment.

The user device 340 includes one or more devices capable of receiving, generating, storing, processing, and/or providing information, as described elsewhere herein. The user device 340 may include a communication device and/or a computing device. For example, the user device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
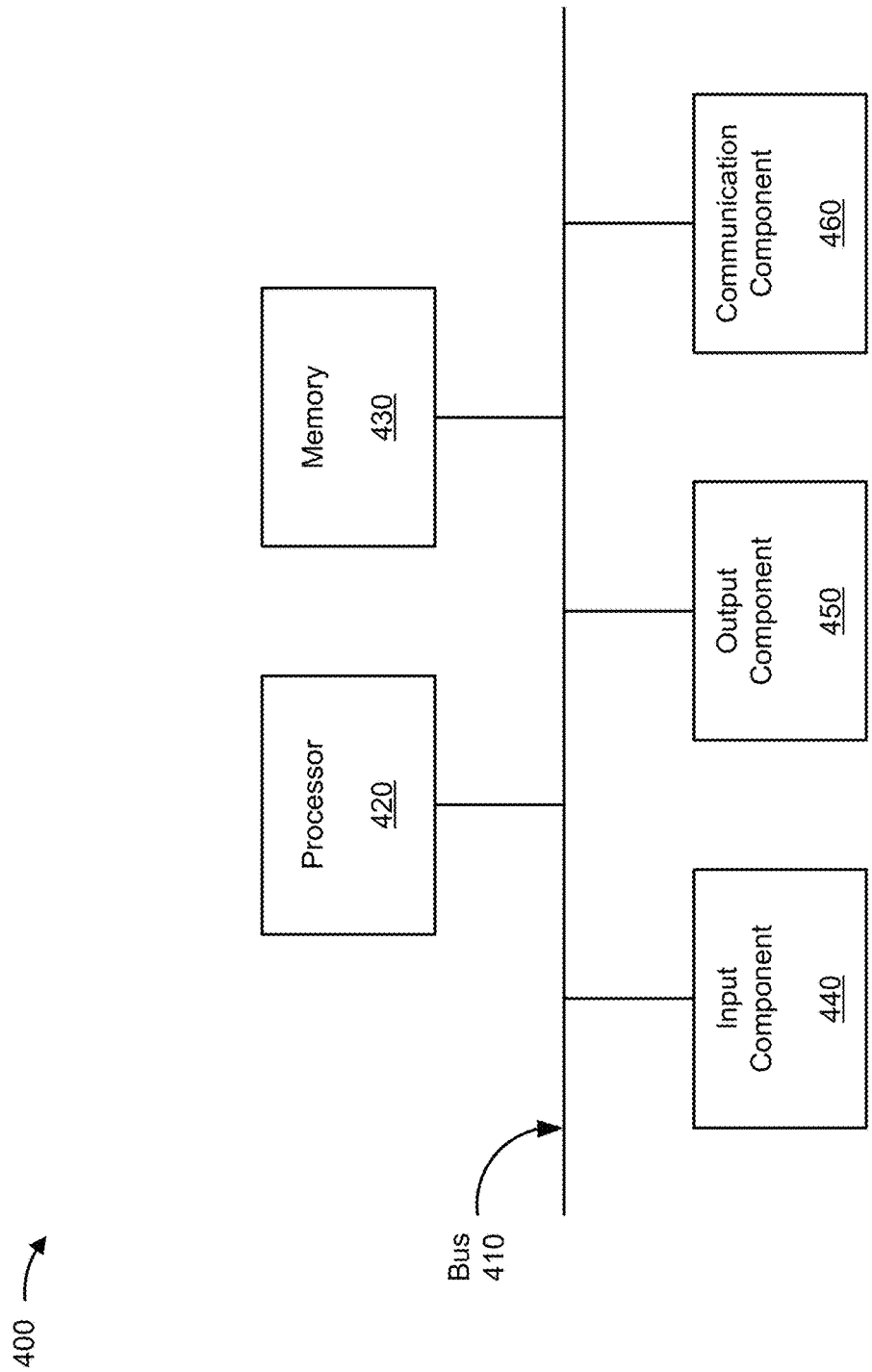
FIG. 4 is a diagram of example components of one or more devices of FIG. 3.

FIG. 4 is a diagram of example components of a device 400, which may correspond to the solution system 301, the database system 330, and/or the user device 340. In some implementations, the solution system 301, the database system 330, and/or the user device 340 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
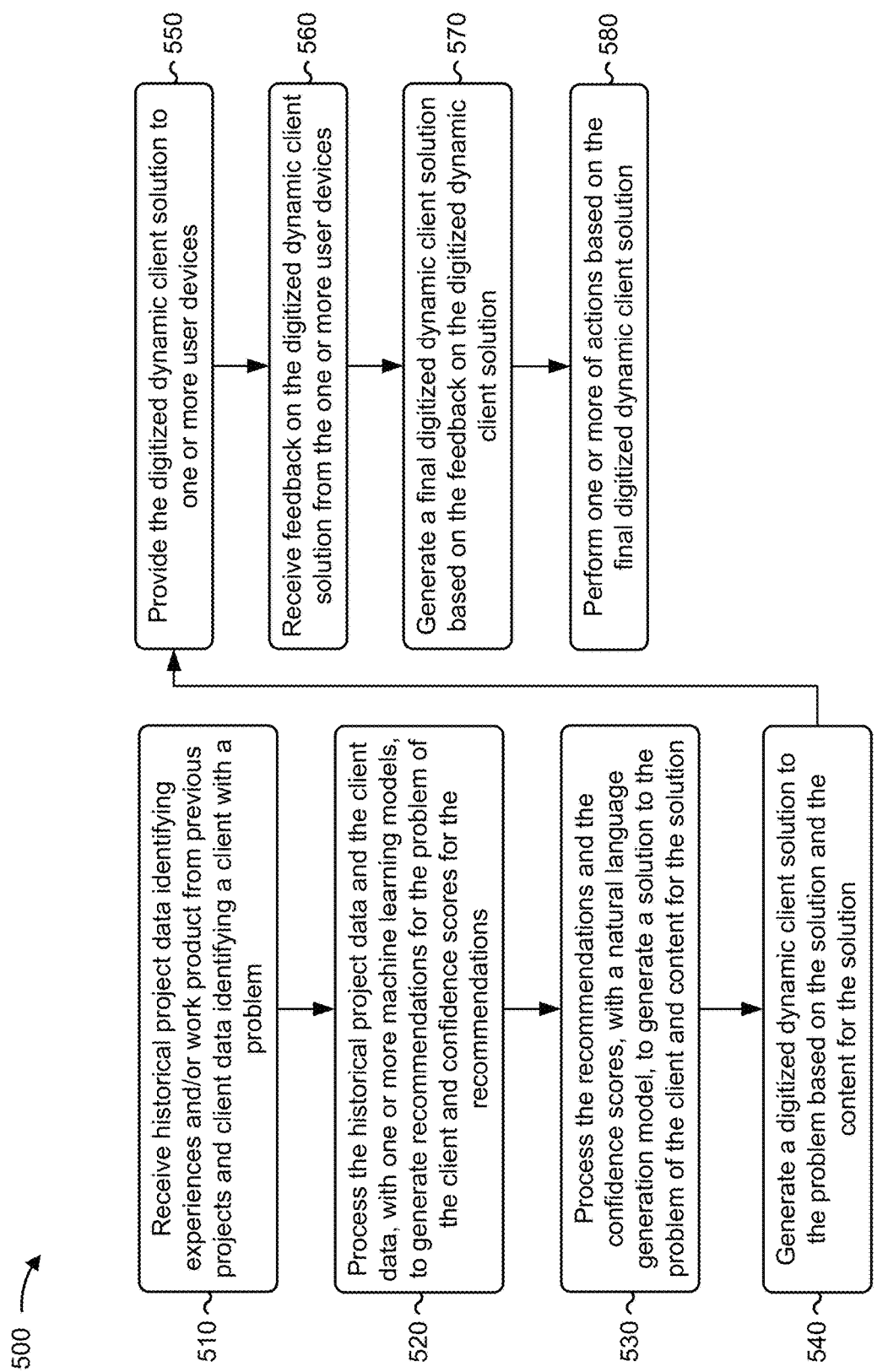
FIG. 5 is a flowchart of an example process for utilizing machine learning and natural language generation models to generate a digitized dynamic client solution.

FIG. 5 is a flowchart of an example process 500 for utilizing machine learning and natural language generation models to generate a digitized dynamic client solution. In some implementations, one or more process blocks of FIG. 5 may be performed by a device (e.g., the solution system 301). In some implementations, one or more process blocks of FIG. 5 may be performed by another device or a group of devices separate from or including the device, such as a database system (e.g., the database system 330) and/or a user device (e.g., the user device 340). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving historical project data identifying experiences and/or work product from previous projects and client data identifying a client with a problem (block 510). For example, the device may receive historical project data identifying experiences and/or work product from previous projects and client data identifying a client with a problem, as described above. In some implementations, the historical project data identifies the experiences and/or the work product from previous projects associated with other clients and with the client. In some implementations, the client data includes data identifying one or more of a financial analysis associated with the client, key financial insights associated with the client, earnings call transcripts associated with the client, priorities associated with the client, operational key performance indicators associated with the client, or valuing propositions associated with the client.

As further shown in FIG. 5, process 500 may include processing the historical project data and the client data, with one or more machine learning models, to generate recommendations for the problem of the client and confidence scores for the recommendations (block 520). For example, the device may process the historical project data and the client data, with one or more machine learning models, to generate recommendations for the problem of the client and confidence scores for the recommendations, as described above. In some implementations, processing the historical project data and the client data, with the one or more machine learning models, to generate the recommendations for the problem of the client and the confidence scores for the recommendations includes processing the historical project data and the client data, with a cosine similarity model and a density-based clustering model, to generate one or more content-based recommendations for the problem; generating one or more collaborative-based recommendations for the problem based on profiles of one or more creators of the solution; utilizing a single value decomposition model to combine the one or more content-based recommendations and the one or more collaborative-based recommendations and generate the recommendations for the problem; and utilizing a convolutional neural network model to process and analyze images of the recommendations for the problem.

In some implementations, processing the historical project data and the client data, with the one or more machine learning models, to generate the recommendations for the problem of the client and the confidence scores for the recommendations includes applying weights to the recommendations based on historical success rates associated with the recommendations, and generating the confidence scores for the recommendations based on applying the weights to the recommendations. In some implementations, each of the recommendations includes a template structure, one or more content sections for the template structure, a design for the template structure, and one or more templates generated by subject matter experts.

As further shown in FIG. 5, process 500 may include processing the recommendations and the confidence scores, with a natural language generation model, to generate a solution to the problem of the client and content for the solution (block 530). For example, the device may process the recommendations and the confidence scores, with a natural language generation model, to generate a solution to the problem of the client and content for the solution, as described above. In some implementations, processing the recommendations and the confidence scores, with the natural language generation model, to generate the solution to the problem of the client and the content for the solution includes receiving template data identifying templates generated by subject matter experts and client solutions data identifying solutions generated for clients similar to the client, processing the recommendations, the confidence scores, the template data, the client solutions data, and the client data, with a long short-term memory model, to generate the solution to the problem and the content for the solution.

In some implementations, the solution includes one of the recommendations and the content for the solution includes textual data for the solution, layouts for the solution, paragraphs for the solution, and imagery for the solution.

As further shown in FIG. 5, process 500 may include generating a digitized dynamic client solution to the problem based on the solution and the content for the solution (block 540). For example, the device may generate a digitized dynamic client solution to the problem based on the solution and the content for the solution, as described above.

As further shown in FIG. 5, process 500 may include providing the digitized dynamic client solution to one or more user devices (block 550). For example, the device may provide the digitized dynamic client solution to one or more user devices, as described above.

As further shown in FIG. 5, process 500 may include receiving feedback on the digitized dynamic client solution from the one or more user devices (block 560). For example, the device may receive feedback on the digitized dynamic client solution from the one or more user devices, as described above. In some implementations, the feedback on the digitized dynamic client solution includes one or more added or edited folds for a template of the digitized dynamic client solution, one or more added images for the digitized dynamic client solution, one or more added videos for the digitized dynamic client solution, an added logo of the client for the digitized dynamic client solution, or one or more hidden or reordered folds for the template of the digitized dynamic client solution.

As further shown in FIG. 5, process 500 may include generating a final digitized dynamic client solution based on the feedback on the digitized dynamic client solution (block 570). For example, the device may generate a final digitized dynamic client solution based on the feedback on the digitized dynamic client solution, as described above. In some implementations, the final digitized dynamic client solution includes one or more of an interactive digital presentation, an interactive video, an interactive web page, or an interactive digital document.

As further shown in FIG. 5, process 500 may include performing one or more actions based on the final digitized dynamic client solution (block 580). For example, the device may perform one or more actions based on the final digitized dynamic client solution, as described above. In some implementations, performing the one or more actions includes one or more of providing the final digitized dynamic client solution for display; causing the final digitized dynamic client solution to be provided to the client; or providing the final digitized dynamic client solution to sales personnel responsible for the client. In some implementations, performing the one or more actions includes one or more of causing a product or a service to be provided to the client based on the final digitized dynamic client solution; receiving feedback on the final digitized dynamic client solution and modifying the final digitized dynamic client solution based on the feedback, or retraining the one or more machine learning models and/or the natural language generation model based on the final digitized dynamic client solution.

In some implementations, performing the one or more actions includes providing the final digitized dynamic client solution to the one or more user devices; receiving, from the one or more user devices, modifications to the final digitized dynamic client solution; and generating a modified final digitized dynamic client solution based on the modifications to the final digitized dynamic client solution.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
   receiving, by a device, historical project data identifying experiences and/or work product from previous projects and client data identifying a client with a problem;
   processing, by the device, the historical project data and the client data, with one or more machine learning models, to generate recommendations for the problem of the client and confidence scores for the recommendations, wherein the processing the historical project data and the client data includes:

applying weights to the recommendations based on historical success rates associated with the recommendations; and generating the confidence scores for the recommendations based on applying the weights to the recommendations;

processing, by the device, the recommendations and the confidence scores, with a natural language generation model, to generate a solution to the problem of the client and content for the solution;

generating, by the device, a digitized dynamic client solution to the problem based on the solution and the content for the solution;

providing, by the device, the digitized dynamic client solution to one or more user devices;

receiving, by the device, editing of the digitized dynamic client solution from the one or more user devices;

generating, by the device a final digitized dynamic client solution based on the editing of the digitized dynamic client solution; and performing, by the device, one or more actions based on the final digitized dynamic client solution.

2. The method of claim 1, wherein the historical project data identifies the experiences and/or the work product from previous projects associated with other clients and with the client.

3. The method of claim 1, wherein the client data includes data identifying one or more of:
   a financial analysis associated with the client,
   key financial insights associated with the client,
   earnings call transcripts associated with the client,
   priorities associated with the client,
   operational key performance indicators associated with the client, or
   value propositions associated with the client.

4. The method of claim 1, wherein processing the historical project data and the client data, with the one or more machine learning models, to generate the recommendations for the problem of the client and the confidence scores for the recommendations comprises:
   processing the historical project data and the client data, with a cosine similarity model and a density-based clustering model, to generate one or more content-based recommendations for the problem;
   generating one or more collaborative-based recommendations for the problem based on profiles of one or more creators of the solution;
   utilizing a single value decomposition model to combine the one or more content-based recommendations and the one or more collaborative-based recommendations and generate the recommendations for the problem; and
   utilizing a convolutional neural network model to process and analyze images of the recommendations for the problem.

5. The method of claim 1, wherein each of the recommendations includes a template structure,
   one or more content sections for the template structure,
   a design for the template structure, and
   one or more templates generated by subject matter experts.

6. The method of claim 1, wherein processing the recommendations and the confidence scores, with the natural language generation model, to generate the solution to the problem of the client and the content for the solution comprises:

receiving template data identifying templates generated by subject matter experts and client solutions data identifying solutions generated for clients similar to the client; and processing the recommendations, the confidence scores, the template data, the client solutions data, and the client data, with a long short-term memory model, to generate the solution to the problem and the content for the solution.

7. A device, comprising:
one or more memories; and
one or more processors, coupled to the one or more memories, configured to:
   receive historical project data identifying experiences and/or work product from previous projects and client data identifying a client with a problem,
   process the historical project data and the client data, with one or more machine learning models, to generate recommendations for the problem of the client and confidence scores for the recommendations, wherein the historical project data and the client data are processed by:
      applying weights to the recommendations based on historical success rates associated with the recommendations; and
      generating the confidence scores for the recommendations based on applying the weights to the recommendations;
   wherein each of the recommendations includes:
   a template structure,
   one or more content sections for the template structure,
   a design for the template structure, and one or more templates generated by subject matter experts;
   process the recommendations and the confidence scores, with a natural language generation model, to generate a solution to the problem of the client and content for the solution;
   generate a digitized dynamic client solution to the problem based on the solution and the content for the solution;
   provide the digitized dynamic client solution to one or more user devices;
   receive editing of the digitized dynamic client solution from the one or more user devices;
   generate a final digitized dynamic client solution based on the editing of the digitized dynamic client solution; and
   perform one or more actions based on the final digitized dynamic client solution.

8. The device of claim 7, wherein the solution includes one of the recommendations and the content for the solution includes:
   textual data for the solution,
   layouts for the solution,
   paragraphs for the solution, and
   imagery for the solution.

9. The device of claim 7, wherein the editing of the digitized dynamic client solution includes one or more of:
   one or more added or edited folds for a template of the digitized dynamic client solution,
   one or more added images for the digitized dynamic client solution,
   one or more added videos for the digitized dynamic client solution,
   an added logo of the client for the digitized dynamic client solution, or one or more hidden or reordered folds for the template of the digitized dynamic client solution.

10. The device of claim 7, wherein the final digitized dynamic client solution includes one or more of:
an interactive digital presentation,
an interactive video,
an interactive web page, or
an interactive digital document.

11. The device of claim 7, wherein the one or more processors, to perform the one or more actions, are configured to one or more of:
provide the final digitized dynamic client solution for display, cause the final digitized
dynamic client solution to be provided to the client; or
provide the final digitized dynamic client solution to sales personnel responsible for the client.

12. The device of claim 7, wherein the one or more processors, to perform the one or more actions, are configured to one or more of:
cause a product or a service to be provided to the client based on the final digitized dynamic client solution;
receive feedback on the final digitized dynamic client solution and modify the final digitized dynamic client solution based on the feedback; or
retrain the one or more machine learning models and/or the natural language generation model based on the final digitized dynamic client solution.

13. The device of claim 7, wherein the one or more processors, to perform the one or more actions, are configured to:
provide the final digitized dynamic client solution to the one or more user devices;
receive, from the one or more user devices, modifications to the final digitized dynamic client solution; and
generate a modified final digitized dynamic client solution based on the modifications to the final digitized dynamic client solution.

14. A non-transitory computer-readable medium storing a set of instructions, the set of instructions comprising:
one or more instructions that, when executed by one or more processors of a device, cause the device to:
receive historical project data identifying experiences and/or work product from previous projects and client data identifying a client with a problem,
wherein the client data includes data identifying one or more of:
a financial analysis associated with the client,
key financial insights associated with the client,
earnings call transcripts associated with the client,
priorities associated with the client,
operational key performance indicators associated with the client, or
value propositions associated with the client;
process the historical project data and the client data, with one or more machine learning models, to generate recommendations for the problem of the client and confidence scores for the recommendations, wherein the historical project data and the client data are processed by:
applying weights to the recommendations based on historical success rates associated with the recommendations; and
generating the confidence scores for the recommendations based on applying the weights to the recommendations;
process the recommendations and the confidence scores, with a natural language generation model, to generate a solution to the problem of the client and content for the solution;
generate a digitized dynamic client solution to the problem based on the solution and the content for the solution;
provide the digitized dynamic client solution to one or more user devices;
receive editing of the digitized dynamic client solution from the one or more user devices;
generate a final digitized dynamic client solution based on the editing of the digitized dynamic client solution; and
perform one or more actions based on the final digitized dynamic client solution.

15. The non-transitory computer-readable medium of claim 14, wherein the one or more instructions, that cause the device to process the historical project data and the client data, with the one or more machine learning models, to generate the recommendations for the problem of the client and the confidence scores for the recommendations, cause the device to:
process the historical project data and the client data, with a cosine similarity model and a density-based clustering model, to generate one or more content-based recommendations for the problem;
generate one or more collaborative-based recommendations for the problem based on profiles of one or more creators of the solution;
utilize a single value decomposition model to combine the one or more content-based recommendations and the one or more collaborative-based recommendations and generate the recommendations for the problem; and
utilize a convolutional neural network model to process and analyze images of the recommendations for the problem.

16. The non-transitory computer-readable medium of claim 14, wherein the one or more instructions, that cause the device to process the recommendations and the confidence scores, with the natural language generation model, to generate the solution to the problem of the client and the content for the solution, cause the device to:
receive template data identifying templates generated by subject matter experts and client solutions data identifying solutions generated for clients similar to the client; and
process the recommendations, the confidence scores, the template data, the client solutions data, and the client data, with a long short-term memory model, to generate the solution to the problem and the content for the solution.

17. The non-transitory computer-readable medium of claim 14, wherein the one or more instructions, that cause the device to perform the one or more actions, cause the device to one or more of:
provide the final digitized dynamic client solution for display;
cause the final digitized dynamic client solution to be provided to the client;
provide the final digitized dynamic client solution to sales personnel responsible for the client,
cause a product or a service to be provided to the client based on the final digitized dynamic client solution;
receive feedback on the final digitized dynamic client solution and modify the final digitized dynamic client solution based on the feedback; or retrain the one or more machine learning models and/or the natural language generation model based on the final digitized dynamic client solution.

18. The non-transitory computer-readable medium of claim 14, wherein the one or more instructions, that cause the device to perform the one or more actions, cause the device to:

provide the final digitized dynamic client solution to the one or more user devices;

receive, from the one or more user devices, modifications to the final digitized dynamic client solution; and generate a modified final digitized dynamic client solution based on the modifications to the final digitized dynamic client solution.

\* \* \* \* \*